United States Patent [19]
Kinane

[11] Patent Number: 5,388,880
[45] Date of Patent: Feb. 14, 1995

[54] VEHICULAR COMPARTMENT FOR REMOTE CONTROL TRANSMITTER

[75] Inventor: Dennis J. Kinane, Commerce, Mich.

[73] Assignee: Ford Motor Company, Dearborn, Mich.

[21] Appl. No.: 179,054

[22] Filed: Jan. 7, 1994

[51] Int. Cl.⁶ .............................................. B60R 7/04
[52] U.S. Cl. ................... 296/37.7; 296/37.8; 224/311
[58] Field of Search ................... 296/37.1, 37.7, 37.8, 296/37.12; 224/42.42, 282, 309, 311, 317, 324; 200/61.62, 61.81, 61.82

[56] References Cited

U.S. PATENT DOCUMENTS

| | | | |
|---|---|---|---|
| 4,241,870 | 12/1980 | Marcus | 296/37.7 |
| 4,595,228 | 6/1986 | Chu | 296/37.7 |
| 4,844,533 | 7/1989 | Dowd et al. | 296/37.7 X |
| 4,867,498 | 9/1989 | Delphin et al. | 296/37.7 |
| 5,064,974 | 11/1991 | Vigneau et al. | 296/37.7 X |
| 5,098,150 | 3/1992 | Smith et al. | 296/97.5 X |

FOREIGN PATENT DOCUMENTS 3189249 8/1991 Japan ........................... 296/37.8

OTHER PUBLICATIONS

"Supplement To the 1992 Sierra (X-9204), C/K Series (C-9204) Yukon and Suburban (X-9309) and Blazer and Suburgan (C-9209) Owner's Manuals," General Motors Corporation, 1992.

*Primary Examiner*—Dean J. Kramer
*Attorney, Agent, or Firm*—Mark Mollon; Roger L. May

[57] ABSTRACT

A storage and activation system for a remote control transmitter in a motor vehicle includes a recessed compartment for receiving the remote control transmitter and a cover for enclosing the recessed compartment. The transmitter is retained against the inside face of the cover for engaging a movable pushbutton extending through the cover. The cover is removable for ease of installation of the transmitter.

4 Claims, 2 Drawing Sheets

VEHICULAR COMPARTMENT FOR REMOTE CONTROL TRANSMITTER

BACKGROUND OF THE INVENTION

The present invention relates in general to a storage and activation system for a remote control transmitter in a motor vehicle and more specifically to a self-contained mounting and activating unit.

With the proliferation of remote control garage door openers, automobile manufacturers have provided transmitter storage compartments in the interior of the vehicle wherein the transmitter is stored out of sight behind a panel matching the vehicle interior. The transmitter may be activated by depressing a portion of the panel, such as a panel pushbutton. The transmitter must be positioned in the correct location and at the correct orientation for proper activation by the pushbutton.

A typical storage system includes a compartment covered by a pivotable door. The remote transmitter is retained in the compartment using hook-and-loop fasteners and/or tape. A plunger on the door panel (e.g., extending from a pushbutton) engages the activation button on the remote transmitter when the panel or pushbutton is depressed.

Since remote garage transmitters come in various sizes and shapes, a series of adjustments must be made to center the activation button of the remote transmitter with the plunger in the prior art systems. Furthermore, it is necessary to adjust the length of the plunger to obtain proper interaction with the transmitter activation button. A series of pegs are typically snapped onto the plunger in order to adjust its length. The pegs can be difficult to use, and if they are lost, the system may be unusable.

The remote control transmitter compartment is often located in an overhead console. The overhead position makes it more awkward to locate the transmitter in the proper location and orientation and to make the adjustments.

SUMMARY OF THE INVENTION

The present invention has the advantages of providing a self-contained system without cumbersome adjustments and which may be removed from an overhead console to facilitate installation of the remote transmitter.

These and other advantages are achieved by a storage and activation system for a remote control transmitter in a motor vehicle comprising a recessed compartment sized to receive the remote control transmitter. A cover encloses the recessed compartment and is displaceable for introducing the remote control transmitter to the recessed compartment. The cover has an inside face and an outside face. A movable pushbutton having a button face proximate to the outside face has a plunger for extending into the recessed compartment in response to a force applied to the button face. A retainer secures the remote control transmitter against the inside face such that extension of the plunger activates the remote control transmitter. The retainer preferably comprises a spring clip adapted to receive a wide variety of remote control transmitter sizes.

DETAILED DESCRIPTION OF THE PREFERRED EMBODIMENTS

Figure 1:
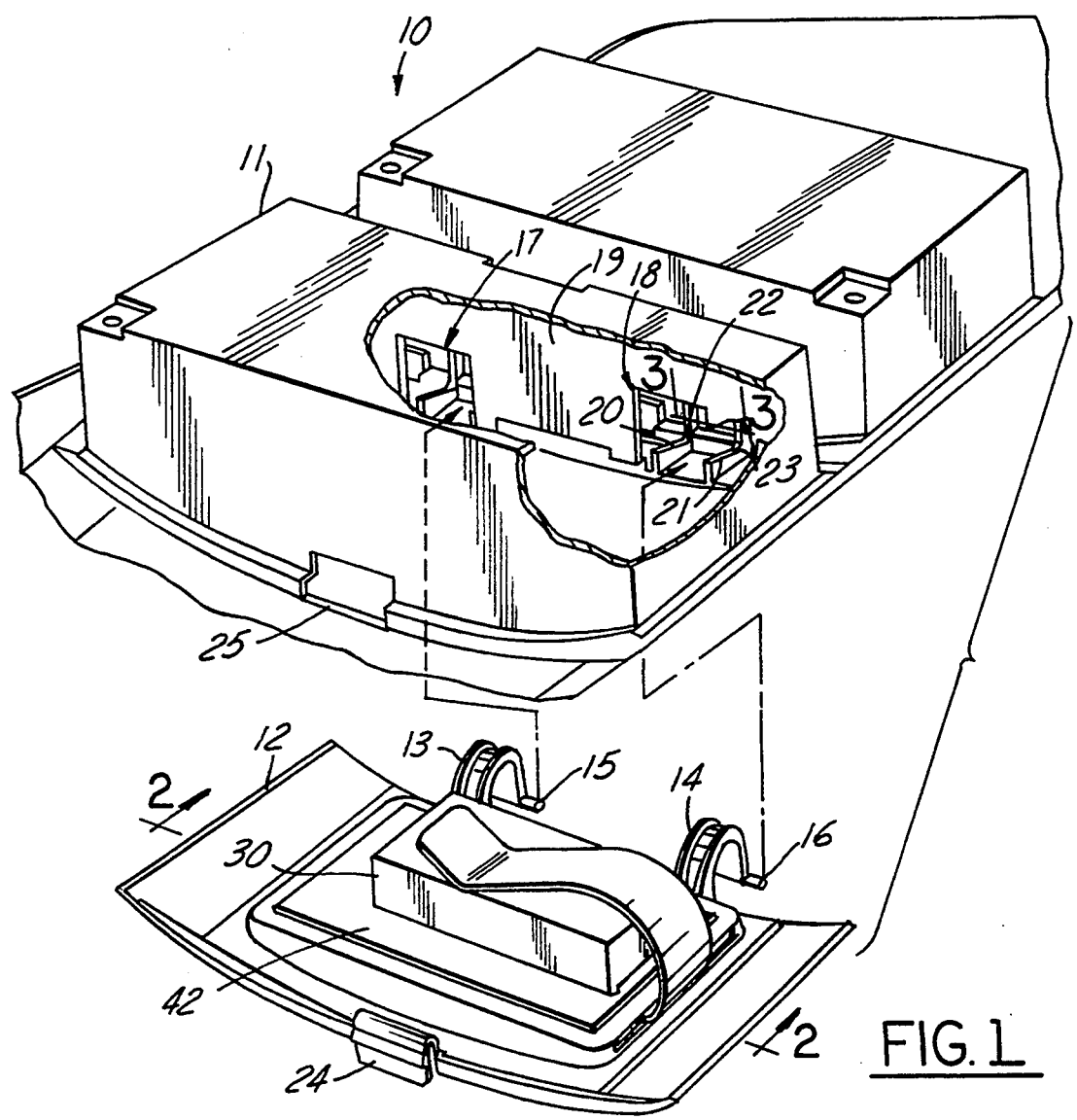
FIG. 1 is a perspective view of an overhead console and the storage and activation system with the cover removed.

FIG. 1 shows an overhead console 10 having a storage and activation system for a remote control transmitter comprising a recessed compartment 11 which removably receives a cover 12. Releasable hinges are employed including goose necks 13 and 14 projecting from cover 12 and having hinge pins 15 and 16 at their remote ends. Substnatially identical stationary hinge portions 17 and 18 are provided in recessed compartment 11 behind a sidewall 19. Stationary hinge portion 18 includes a pair of recessed ramps 20 and 21 and hinge pin support surfaces 22 and 23 for receiving hinge pin 16.

Figure 3:
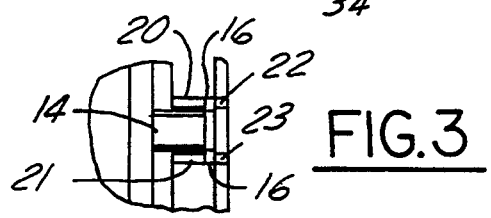
FIG. 3 is a top view of the releasable hinge of the invention after installation.

For installation of cover 12, the hinge pins are slid down the ramps to the hinge pin support surfaces and the cover is pivoted up in a manner to enclose recessed compartment 11. A release clip 24 on cover 12 engages a catch 25 on recessed compartment 11 to retain cover 12. FIG. 3 shows a top view of the hinge during engagement.

Figure 2:
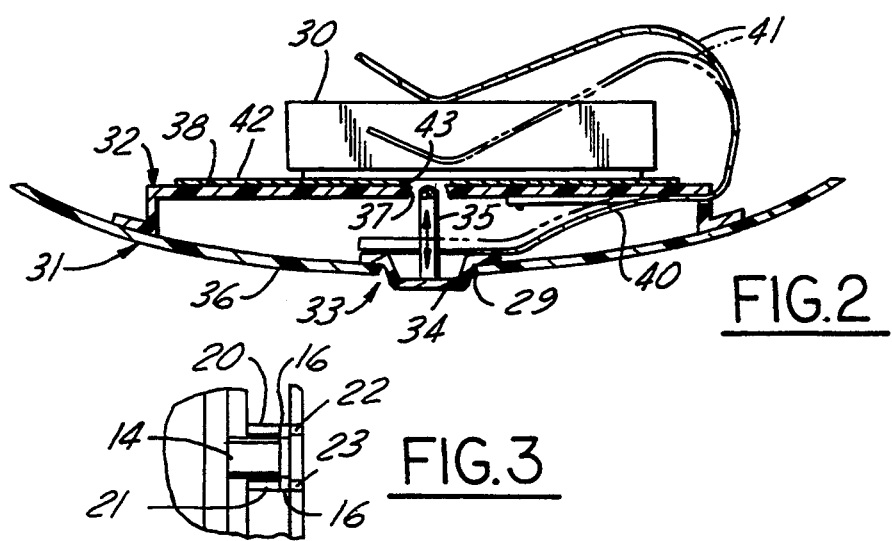
FIG. 2 is a cross-sectional view of the cover along lines 2—2 of FIG. 1.

As shown in FIGS. 1 and 2, a remote control transmitter 30 is retained by cover 12. Cover 12 includes a trim cover 31 and a base 32. A hole 29 in trim cover 31 receives a pushbutton 33 having a button face 34 and a plunger 35. Button face 34 is proximate the outside face 36 of trim cover 31. The end of plunger 35 is adapted to extend through hole 37 in base 32 beyond inside face 38 of base 32 in response to a force applied to button face 34. A leaf spring 40 urges pushbutton 33 toward trim cover 31.

Remote control transmitter 30 is retained against inside face 38 by spring clip 41. A foam pad 42 is disposed on inside face 38 and has a hole 43 for receiving plunger 35. Foam pad 42 cushions remote control transmitter 30 and reduces sliding. Foam pad 42 may be affixed to base 32 by an adhesive and base 32 may be affixed to trim cover 31 by sonic welding, for example.

Remote control transmitter 30 has an activation button (not shown) that can be easily aligned with plunger 35 and holes 37 and 43 when transmitter 30 is installed under spring clip 41.

Figure 4:
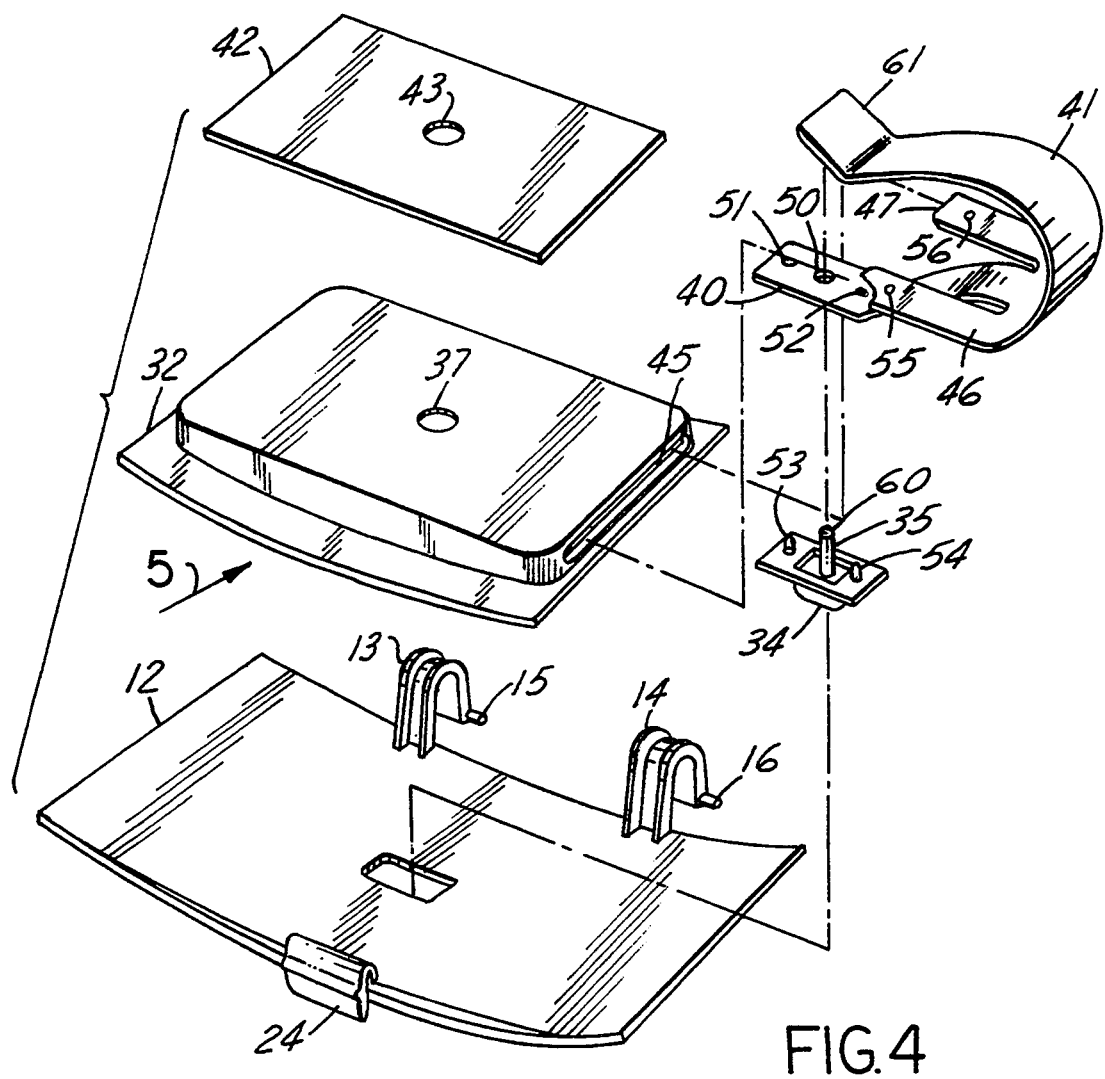
FIG. 4 is an exploded perspective view of the cover of the present invention.
Figure 5:
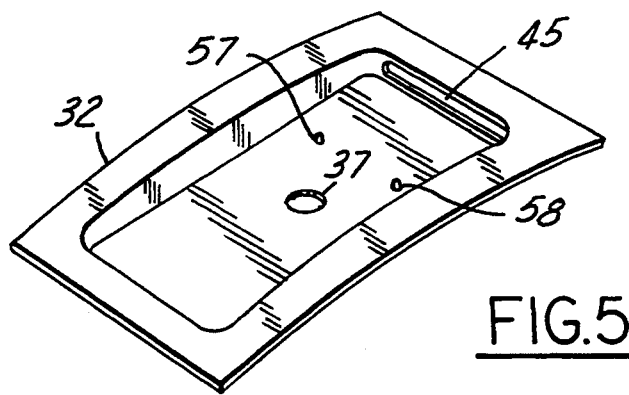
FIG. 5 is a bottom perspective view of the base shown in FIG. 4.

As shown in FIG. 4, base 32 includes a slot 45 for receiving an integrally formed spring clip 41 and leaf spring 40. The integral spring further includes anchors 46 and 47 for anchoring the integral spring to base 32. Leaf spring 40 includes a hole 50 for receiving plunger 35 and has alignment holes 51 and 52 for receiving alignment pins 53 and 54 on pushbutton 33. Alignment pins 53 and 54 are heat staked following insertion through alignment holes 51 and 52 for permanent retention. Likewise, anchors 46 and 47 include alignment holes 55 and 56 for receiving alignment pins 57 and 58 on base 32 as shown in FIG. 5. Alignment pins 57 and 58 are also heat staked following installation of anchors 46 and 47.

In order to protect the remote control transmitter from damage, plunger 35 may include a rubber nipple 60 at its end as shown in FIG. 4. Furthermore, the abutment end 61 of spring clip 41 may include a plastic sheath (not shown).

The present invention provides a user friendly method to install and use the remote control transmitter in an integrated vehicle compartment. To install a transmitter, cover 12 is removed by depressing release clip 24 and lifting cover 12 out from overhead console 10. Spring clip 41 is lifted and the remote control transmitter is centered with its activation button over hole 43 in foam pad 42. Hinge pins 15 and 16 are returned to their ramps and the cover is pivoted into recessed compartment 11 until release clip 24 re-engages catch 25.

By referencing the location of the remote control transmitter activation button to the inside face of cover 12, the need for an adjustable length plunger is eliminated. Therefore, pegs or other adjustments are not needed. In the event that an unusual remote control transmitter shape is encountered with a recessed activation button, a plunger extension could still be employed.

What is claimed is:

1. A storage and activation system for a remote control transmitter in a motor vehicle, comprising:

a recessed compartment sized to receive said remote control transmitter;

a cover for closing said recessed compartment, said cover being displaceable for introducing said remote control transmitter to said recessed compartment, said cover having an inside face and an outside face;

a movable pushbutton having a button face proximate to said outside face and having a plunger for extending into said recessed compartment in response to a force applied to said button face;

a spring clip affixed to said cover and securing said remote control transmitter against said inside face such that extension of said plunger activates said remote control transmitter; and a leaf spring connected to said pushbutton for opposing extension of said plunger, said spring clip and said leaf spring being integrally formed.

2. The system of claim 1 further comprising a foam pad disposed on said inside face to reduce sliding of said remote control transmitter.

3. The system of claim 1 wherein said cover and said retainer are removable as a unit from said recessed compartment for attaching said remote control transmitter.

4. The system of claim 3 wherein said cover further includes a releasable hinge.

* * * * *